United States Patent
Cave et al.

[11] Patent Number: 5,362,240
[45] Date of Patent: Nov. 8, 1994

[54] METHOD AND APPARATUS FOR THE TEACHING OF LANGUAGES

[75] Inventors: Dominique Cave, Paris; Marc Bongiorno, Boisettes, both of France

[73] Assignee: Tomatis International, Paris, France

[21] Appl. No.: 930,654

[22] PCT Filed: Jan. 31, 1992

[86] PCT No.: PCT/FR92/00084

§ 371 Date: Sep. 30, 1992

§ 102(e) Date: Sep. 30, 1992

[87] PCT Pub. No.: WO92/14229

PCT Pub. Date: Aug. 20, 1992

[30] Foreign Application Priority Data

Jan. 31, 1991 [FR] France ............................ 91 01074

[51] Int. Cl.⁵ ...................... G09B 19/06; G09B 19/08; G09B 19/04
[52] U.S. Cl. .......................................... 434/157; 434/185
[58] Field of Search ...................... 434/157, 185

[56] References Cited

U.S. PATENT DOCUMENTS

| | | | |
|---|---|---|---|
| 3,043,913 | 7/1962 | Tomatis | 434/184 X |
| 4,020,567 | 5/1977 | Webster | 434/185 |
| 4,615,680 | 10/1986 | Tomatis | 434/157 |
| 4,662,847 | 5/1987 | Blum | 434/185 |
| 5,065,317 | 11/1991 | Hiramatsu et al. | 364/419 |

FOREIGN PATENT DOCUMENTS

| | | | |
|---|---|---|---|
| 2026817 | 2/1980 | United Kingdom | |
| 9100582 | 1/1991 | WIPO | 434/185 |

*Primary Examiner*—Gene Mancene
*Assistant Examiner*—Cindy A. Cherichetti
*Attorney, Agent, or Firm*—Kuhn and Muller

[57] ABSTRACT

An apparatus and method for language teaching is provided, which includes use of a microphone for receiving a statement by a person in the language sought to be learned. A first signal is created, and the first signal is subjected to a first processing step to create a second signal. The second signal contains the first signal in a modified form, in a predetermined manner according to the envelope curve derived from selected pass bands of the language sought to be learned. The first signal is subjected to a second processing step to create a third signal which contains the first signal modified according to the harmonic content of the statement and according to the characteristics of the language. Finally, either the second or third signal is sent to the person, depending upon whether the amplitude of the first signal is above or below a predetermined threshold.

8 Claims, 1 Drawing Sheet

METHOD AND APPARATUS FOR THE TEACHING OF LANGUAGES

This invention relates to a method and apparatus for teaching languages, and in particular foreign languages.

It is a well-known fact that the vocal output of a person, that is the sounds that he emits, undergoes a significant transformation in relation to the auditory message fed to him, that is to say the sound information that he receives.

It is easy to understand therefore that progress made in the teaching of a foreign language will be more rapid if the person learning a language, instead of endlessly repeating the same sentence and being corrected either by a teacher or by a machine until the pronunciation of this sentence is correct, at least receives an auditory message which originates from his own vocal output and which has been modified by means of a process to take the characteristics of the language and the harmonic content of his own vocal output into account.

There are already several devices, notably in the specific area of language instruction, in which a person's statements are received, processed and fed back to him in a modified form by a vibratory signal, in general a sound signal.

Accordingly, the applicant has proposed, in patent specification GB-A-2 026 817, that an electric signal originating from the statement of a person be processed simultaneously and in parallel in two different channels, by filtration and amplification. The output signal from one of the two channels is then applied to the person according to the amplitude of the sound level of his statement.

In patent BE-A-782 406 the input signal is processed in a similar manner but, in this instance, the output signal from one of the channels is firstly fed back to the person at the start of the learning process and then the output signal from the other channel after a certain stage of the learning process.

In patent FR-A-2 495 361 a progressive correlation is formed between the sound level and the frequency of the person's statement and the signal thus processed is applied to the person.

The present invention seeks to provide a method and apparatus for the teaching of languages which allow one to effect corrections on a person's actual original vocal output arising from modifications made to the auditory output and from the language studied.

For this purpose, the method according to the invention includes the steps of
- receiving a statement by a person in a language to be learnt in order to create a first signal containing this statement;
- subjecting this first signal to a first processing step in order to create a second signal which contains the first signal modified in a predetermined manner according to an envelope curve derived from preselected pass bands of the language being learnt;
- subjecting the first signal to a second processing step to create a third signal which contains the first signal modified according to the harmonic content of the statement and according to the characteristics of the language; and
- selectively feeding the second or the third signal to the person depending on whether the amplitude of the first signal, is above or below a predetermined threshold.

Thus, after each statement uttered, the person will in return receive selectively either a first sound message which corresponds to his own statement modified according to the predetermined parameters of the language being learnt, in particular the frequencies of this language, or a second correctional sound message which corresponds to his own statement but which is modified in this instance according to the harmonic content of the statement itself and of the characteristics of the language being learnt.

Preferably, and in a known manner, these two sound messages are relayed to the person through the medium of his or her bone structure, or by airwaves, the latter route being slightly slower than the former. For this purpose, according to the invention, the second and third signals are each fed to a first and a second switch which respectively control, after amplification and predetermined successive delays for the transition from the second signal to the third signal, and without delay for resumption of the second signal, through at least one vibrator placed on the skin in the vicinity of the person's skull, and at least one earphone placed over one of the person's ears.

To implement this method, an apparatus according to the invention is provided which includes
- a microphone for receiving a statement by a the person in the language being learnt and for creating a first signal;
- a first processing circuit for the first signal for creating a second signal modified in relation to the first signal according to an envelope curve derived from preselected pass bands of the language being learnt;
- a second processing circuit for the first signal which creates a third signal modified in relation to the first signal according to the harmonic content of the statement and according to the characteristics of the language; and
- means for selectively feeding the second or the third signal to the person, depending on whether the amplitude of the first signal is below or above a predetermined threshold.

In a particular embodiment, the second circuit includes:
- an adaptation circuit for modifying the first signal such that its amplitude falls between two predetermined values;
- an analysis circuit for producing an output signal whose amplitude is a function of the instantaneous frequency of the modified first signal;
- a computing circuit for producing an output signal whose amplitude is proportional to the difference between the amplitudes of the output signal from the analysis circuit and of predetermined parameters of the language; and
- a circuit for receiving and modifying the first signal using output parameters created by the calculation circuit in order to produce the third signal.

In addition, the apparatus may contain
- a first and a second switch for respectively receiving the second and third signals;
- at least one vibrator locatable on the person's skin, preferably in the vicinity of the person's skull, and controlled by the first switch;
- at least one earphone locatable over one ear of the person and connected to the second switch; and means for selectively and respectively operating the two switches in such a manner as to feed the second signal or the third signal to the person.

These signals are respectively propagated by the person's bone structure, or by airwaves, the latter route being slightly slower than the former.

The invention will be easily understood by reading the description which follows and by referring to the attached drawing which forms part of the specification, this single drawing being a sketch showing an apparatus constructed according to a preferred embodiment of the invention.

Figure 1:
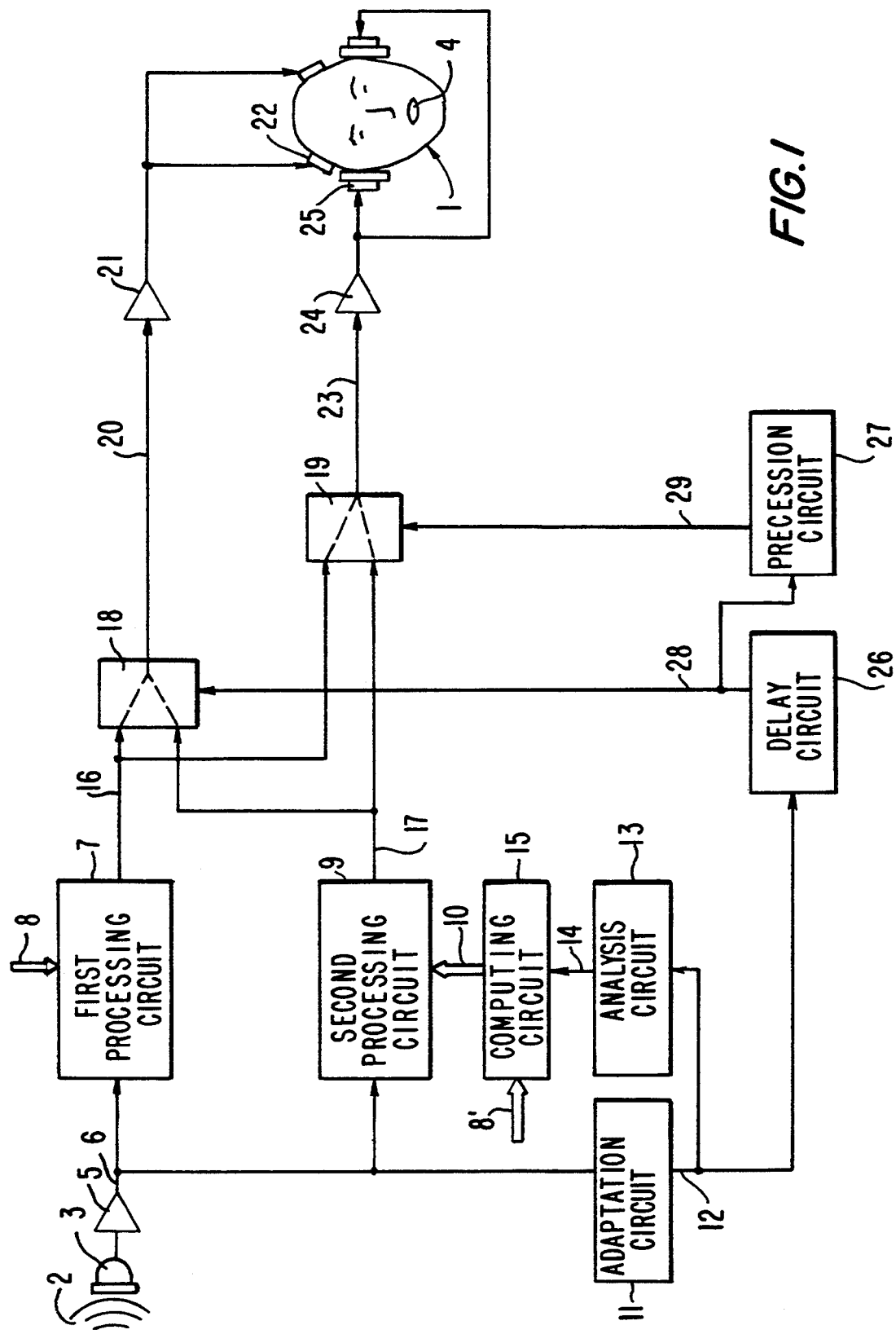
FIG. 1 is an schematic chart of the apparatus of the present invention.

In the drawing FIG. 1 a person 1 is shown whose statement 2 in the language being learnt is received by a microphone 3. For illustrative convenience, the microphone 3 is depicted at a distance from the person 1. In reality the microphone 3 is placed in the immediate vicinity of the mouth 4 of the person 1. The microphone 3 emits a first signal 6 which contains statement 2, preferably after amplification by an amplifier 5 to ensure that the signal has a desired amplitude.

The signal 6 is fed to a first processing circuit 7, called a multifrequency equalizer, which is controlled in a predetermined manner by controlling parameters, indicated by 8, according to the language being learnt, and more particularly according to predetermined pass bands of this language. In practice, the equalizer 7 is constituted by a plurality of successive filters respectively tuned to different frequencies and having a low quality coefficient so that adjacent gain curves of the filters according to frequency overlap at successive descending and ascending fronts. One thus obtains, via the equalizer 7 and the controlling parameters 8, an envelope curve of gain in relation to frequency, this envelope curve being representative of the language to be learnt.

The first signal 6 is also fed to a second processing circuit 9, also a multifrequency equalizer, whose controlling parameters, indicated by 10, are not predetermined but established partly according to the language to be learnt, as shown by 8', and partly according to the harmonic content of the sound vibration of the statement 2. The first signal 6 is fed to an adaptation circuit 11, a so-called compandor whose function is to avoid faulty analysis of the statement 2, when it is either too weak or too strong. In the present example, using the amplifier 5 as described above, circuit 11 merely serves to compress the maxima of the signal 6 since the amplifier 5 ensures that at least minimum values are provided. The output signal 12 from circuit 11 is fed to an analysis circuit 13 for producing an output signal 14 whose amplitude is a function of the instantaneous frequency of the first signal 6, modified to provide signal 12. In use, this circuit 13 divides the signal 12 into different frequency ranges in order to apply different gains to them. The amplitude of the output signal 14 from circuit 13 is thus a function of the frequencies of the signal 12.

The signal 14 in respect of its amplitude is in turn processed in a computing circuit 15 whose output indicated by 10 defines the controlling parameters for the processing circuit 9. This circuit 15 determines the difference, for each frequency range, between the signal 14 and the parameters 8', which are created in similar fashion to the parameters 8, according to the language to be learnt. Thus, whereas the equalizer 7 is given parameters only according to the frequency characteristics of the language to be learnt, the equalizer 9 is given parameters, indicated by 10, according to the difference in frequency between a processed signal originating from the actual statement of the person, and the frequency characteristics of this language.

Thus, using the first signal 6 containing the statement 2 of the person 1, a second signal 16 is created which is modified in relation to the first signal in a predetermined manner according to the pass bands of the language to be learnt, more particularly according to the envelope curve of this language, while a third signal 17 is derived from the first signal 6 by modification according to the harmonic content of the statement 2 and the characteristics of the language.

The two signals 16 and 17 are then, depending on their content, selectively fed to the person 1 who thus receives either of the two signals 16 and 17 in response to his statement 2.

Preferably each of the two signals 16 and 17 is fed by known means to the person 1 by way of his or her bone structure and via airwaves. For this purpose, the apparatus contains a first switch 18 which receives the two signals 16 and 17 and a second switch 19 which also receives these two signals. The output signal 20 of the first switch 18 controls, preferably after amplification in an amplifier 21, at least one transducer 22, and optionally two, which are placed on the skin or the hair of the person 1 in the immediate vicinity of his or her skull, whereas the output signal 23 of the second switch 19 controls, preferably after amplification in 24, at least one earphone 25, and preferably two, placed over the ears of the person 1.

The first switch 18 is controlled by a delay circuit 26, which receives the output signal 12 of the adaptation circuit 11 as an input signal. The second switch 19 is controlled by the output signal 29 of a so-called precession circuit 27 which is driven by the output signal 28 of the delay circuit 26 which controls switch 18. Switches 18 and 19 and the controlling circuits 26 and 27 are so constructed that the auditory messages to the person 1, corresponding to the processed signals 16 and 17 are conveyed in a chosen sequence with desired alternations and delays.

In this example, circuit 26 leads to switch 18, with an initial predetermined delay, then to switch 19, with an additional delay predetermined by circuit 27, upon the entry of signal 17 if it detects an ascending amplitude of signal 12 with reference to a predetermined threshold. The switches 18 and 19 are again actuated upon the entry of signal 16, under the control of circuits 26 and 27, without any delay, as soon as this threshold is again crossed by the descending amplitude of signal 12. Thus the person 1 receives signal 16 if his own statement is correct, and the correctional signal 17 if his statement is incorrect. As was pointed out above, this is advantageous in language instruction on account of the contrast created between the vocal output and the auditory response received which corresponds to this vocal output.

We claim:

1. A method of language teaching which includes the steps of
    receiving a statement by a person in a language to be learnt in order to create a first signal containing this statement;

subjecting this first signal to a first processing step in order to create a second signal which contains the first signal modified in a predetermined manner according to an envelope curve derived from selected pass bands of the language being learnt;

subjecting the first signal to a second processing step in order to create a third signal which contains the first signal modified according to the harmonic content of the statement and according to the characteristics of the language; and selectively feeding the second or third signal to the person depending on whether the amplitude of the first signal is respectively above or below a predetermined threshold.

2. A method according to claim 1, in which a transition from the second signal to the third signal occurs with a predetermined delay whenever the amplitude of the first signal exceeds the predetermined threshold, and resumption of the second signal occurs without delay whenever the amplitude of the first signal drops below the predetermined threshold.

3. A method according to either claim 1 or claim 2 in which the second and third signals are each fed to a first and a second switch which respectively feed these signals to at least one vibrator placed on the skin of the person, and at least one earphone placed over one ear of the person.

4. An apparatus for practicing a method of language teaching, which includes:

a microphone for receiving a statement by a person in the language being learned and for creating a first signal;

a first processing circuit for the first signal for creating a second signal modified in relation to the first signal according to an envelope curve derived from predetermined pass bands of the language to be learned;

a second processing circuit for the first signal for creating a third signal modified in relation to the first signal according to the harmonic content of the statement and according to the characteristics of the language; and means for selectively feeding the second or the third signal to the person depending on whether the amplitude of the first signal is above or below a predetermined threshold; the apparatus further including:

a circuit for modifying the first signal so that its amplitude extends between two predetermined values;

an analysis circuit for producing an output signal whose amplitude is a function of the frequency of the modified first signal;

a calculation circuit for creating an output signal whose amplitude is proportional to the difference between the amplitudes of the output signal from the analysis circuit and of predetermined parameters of the language; and a circuit for receiving and modifying the first signal using controlling parameters created by the output of the calculation circuit in order to create the third signal.

5. An apparatus according to either claim 4 which includes at least one delay circuit whereby in use a transition from the second signal to the third signal being fed to the person occurs with a predetermined delay whenever the amplitude of the first signal exceeds the predetermined threshold, and resumption of the second signal occurs without delay whenever the amplitude of the first signal drops below the predetermined threshold.

6. An apparatus according to any of the claim 4 which includes a first and a second switch, receiving the second and third signals;

at least one vibrator locatable on the skin of the person and connected to the first switch;

at least one earphone locatable over one of the persons's ears connected to the second switch; and means for selectively and respectively operating the two switches in such a manner as to feed the second or the third signal to the person.

7. An apparatus for practicing a method of language teaching, which includes a microphone for receiving a statement by a person in the language being learned and for creating a first signal;

a first processing circuit for processing the first signal to create a second signal modified in relation to the first signal according to an envelope curve derived from predetermined pass bands of the language to be learned;

a second process circuit for processing the first signal to create a third signal modified in relation to the first signal according to the harmonic content of the statement and according to the characteristics of the language;

means for selectively feeding the second or the third signal to the person depending on whether the amplitude of the first signal is above or below a predetermined threshold, said apparatus further including a first and a second switch, receiving the second and third signals;

at least one vibrator locatable on the skin of the person and connected to the first switch;

at least one earphone locatable over one of the person's ears connected to the second switch; and means for selectively and respectively operating the two switches in such a manner as to feed the second or the third signal to the person.

8. An apparatus for practicing a method of language teaching, which includes a microphone for receiving a statement by a person in the language being learned and for creating a first signal;

a first processing circuit for processing the first signal to create a second signal modified in relation to the first signal according to an envelope curve derived from predetermined pass bands of the language to be learned;

a second process circuit for processing the first signal to create a third signal modified in relation to the first signal according to the harmonic content of the statement and according to the characteristics of the language;

means for selectively feeding the second or the third signal to the person depending on whether the amplitude of the first signal is above or below a predetermined threshold, said apparatus further including, at least one delay circuit whereby in use a transition from the second signal to the third signal being fed to the person occurs with a predetermined delay whenever the amplitude of the first signal exceeds the predetermined threshold, and resumption of the second signal occurs without delay whenever the amplitude of the first signal drops below the predetermined threshold.

* * * * *